United States Patent [19]

Pischzik

[11] Patent Number: 4,682,752
[45] Date of Patent: Jul. 28, 1987

[54] HOLDING FIXTURE FOR A PIPE-LINE

[75] Inventor: Bruno Pischzik, Randpark North, South Africa

[73] Assignee: Mannesmann Aktiengesellschaft, Dusseldorf, Fed. Rep. of Germany

[21] Appl. No.: 799,094

[22] Filed: Nov. 18, 1985

[30] Foreign Application Priority Data

Nov. 27, 1984 [DE] Fed. Rep. of Germany ....... 3443648
May 13, 1985 [DE] Fed. Rep. of Germany ....... 3517688

[51] Int. Cl.$^4$ .............................................. F16L 3/20
[52] U.S. Cl. ..................................... 248/550; 248/59; 248/62; 248/DIG. 1; 248/610
[58] Field of Search ................... 248/550, DIG. 1, 49, 248/550, 562–564, 566, 636, 610, 613, 58, 59, 62

[56] References Cited

U.S. PATENT DOCUMENTS 4,023,756 5/1977 Baker .................................. 248/550

FOREIGN PATENT DOCUMENTS 2745473 4/1979 Fed. Rep. of Germany .

*Primary Examiner*—Reinaldo P. Machado
*Assistant Examiner*—Alvin Chin-Shue
*Attorney, Agent, or Firm*—Oblon, Fisher, Spivak, McClelland & Maier

[57] ABSTRACT

The invention relates to a holding fixture for a pipe-line in a structure in which the operating temperature is markedly different from the ambient temperature and the ends of which in its holding posture can be connected to the pipe-line and to portions of the structure of the building by fastening fittings and to devices for registering any change in length occurring as a result of a change in the temperature of the medium flowing through the pipe-line and converting it into a change in the length of the holding fixture.

In order to fulfil the requirement to create a holding fixture for a pipe-line in a structure in which the operating temperature differs markedly from the ambient temperature, it is proposed that any change in the length of the pipe-line (1) be registerable by a first signal transmitter (14), which is physically separated from the components (3, 4a, 4, 5, 6, 7, 8, 9, 10, 11, 11a, 12 and 13) holding the pipe-line (1) and for control purposes connected to a regulating device (18), by means of which an actuator (11, 12, 13) for changing the length of the holding fixture can be activated, and that a second signal transmitter (10a, 15, 15a, 15b, 16, 17 and 20b), which registers the position of the parts of the holding fixture that can be moved by the actuator (11, 12, 13), is connected for control purposes to the regulating device (18).

11 Claims, 8 Drawing Figures

HOLDING FIXTURE FOR A PIPE-LINE

FIELD OF THE INVENTION

The invention relates to a holding fixture for a pipe-line in a structure in which the working temperature differs very considerably from the ambient temperature.

BACKGROUND OF THE INVENTION

Such pipe-lines are subject to thermically-induced changes in length (expansion or contraction) resulting from variations in the temperature of the pipe wall, particularly on their being put into and taken out of use. Totally rigid anchorage of such a pipe-line to parts of the structure may lead to the imposition of impermissibly high stresses on both the pipe-line itself and on the holding fixture. This applies particularly to the steam pipes in power stations. This is why, in order to obviate damage to pipe-lines and to avoid exceeding the permissible loading on junctions with components (e.g., boilers or turbines) connected to the pipe-lines, soft-mounted pipe guides are preferred.

This means that the pipe-line is held in flexible fixtures—i.e., fixtures capable of varying their length in a direction parallel to the pipe they are holding. Consequently the pipe-line is free to move, according to its thermic expansion or contraction, in relation to the structural member to which it is attached (expansion-conditioned displacement). Such holding fixtures can be designed as suspensory fixtures e.g., spring clamps or constant suspension mountings) or as supporting fixtures (e.g., spring rests).

In the course of their use, however, not all points of soft-mounted pipe-line systems move as the calculations might suggest. The reason for this is unpredictable frictional and relaxational effects in the pipe-line system.

These affect the kinetic behaviour of the pipe-lines in a manner that may lead to a considerable shortening of the service life of the pipe-line system. Such unpredictable influences on pipe-lines can be dealt with by means of thermically/mechanically acting "control suspension mountings" of the type familiar from DE-PS No. 27 45 473, the requisite vertical movements of the pipe being adjusted in conformity with actual temperature-conditioned changes in the length of the pipe. The way in which this is done is that the pipe-line is connected to the fulcrum of a bell-crank lever, the longer arm of which pivots on the building side point of suspension of a control rod running parallel to the axis of the pipe and separated from the influence of the temperature, while the shorter arm, lying at right angles to the axis of the pipe, is hinged to the control rod, the other end of which is connected to the pipe. While a change in the temperature of the pipe-line causes an alteration in the distance of the fulcrum of the bell-crank lever and the point of attachment of the other end of the control rod at the pipe-line, the length of the control rod itself and thus the distance between the control rod pivot point at the shorter arm and the point of attachment at the other end of the control rod remain unchanged because the control rod remains uninfluenced by the temperature of the pipe-line. For this reason the bell-crank lever is forced into a rotary movement about its apex, and corresponding to the situation of the lever this finally leads to a displacement of the fulcrum at right angles to the axis of the pipe (that is to say, to a change in the length of the control suspension mounting in the direction of suspension), since the position of the point of suspension at the end attached to the building (at the longer arm) remains unchanged.

Such control suspension mountings have proved to be very effective. They have the disadvantage, however, that they result in heavy and bulky constructions. In particular, it is often impossible to install them because the necessary length of the control rods (e.g. 3–4 meters) is too great for shorter lengths of pipe.

Moreover, the weight of the pipe-line induces considerable stresses in the pipe-line as a result of the leverage exerted through the control rods. It is true that, as taught in DE-PS No. 27 45 473, this effect is considerably alleviated by the installation of relief springs, but that in turn has the disadvantage that it increases the bulk of the construction still further.

OBJECT OF THE INVENTION

The aim of the invention is therefore to improve a holding fixture of this generic type for the control of temperature-conditioned pipe-line displacement by reducing its weight and bulk and by avoiding the inducing of additional stresses in the pipe-line.

SUMMARY OF THE INVENTION

The invention solves this problem by means of a holding fixture in which the change in the length of the pipe-line (1) can be registered by a first signal transmitter (14), which is designed to be physically separate from the parts (3, 4a, 4, 5, 6, 7, 8, 9, 10, 11, 11a, 12, 13) holding the pipe-line (1) and for control purposes is connected to a regulator (18) by means of which an actuator (11, 12, 13) for changing the length of the holding fixture can be actuated and that a second signal transmitter (10a, 15, 15a, 15b, 16, 17, 20b), which registers the position of the parts (3, 4, 4a, 10) of the holding fixture movable by the actuator (11, 12, 13) is connected for control purposes with the regulator (18).

GENERAL DESCRIPTION OF THE INVENTION

The following is a more detailed description of the invention.

The basis of the invention is that the length of a holding fixture for a pipe-line must adjust itself in accordance with the requirements of the thermically-induced expansion or contraction of the pipe-line. In the case of the control suspension mounting that is the subject of DE-PS No. 27 45 473, the components whose job it is to register and convert temperature influences work purely mechanically and are directly connected to the actual load-bearing components of the suspensory device or, as in the case of the bell-crank lever, are actual load-bearing components themselves. It is this circumstance that gives rise to the bulkiness of existing suspension devices, since the requisite changes in length can only properly be utilized by employing long control rods.

By the invention, which can be implemented either as a suspensory or as a support device, structural separation of the various functions of the pipe-line holding fixture is achieved. The pipe-line is attached to the holding fixture in the usual way (e.g., by means of pipe clamps), and the holding fixture in turn is fixed to the structure of the building. The thermically-induced change in the length of the pipe-line is registered by a first signal transmitter physically separated from the component parts of the fixture holding the pipe-line—i.e., the components which carry the load to the structure of the building. This first signal transmitter is linked to a control device which is capable of activating an actuator to change the length of the holding fixture—that is to say, the distance between the point at which the pipe-line is attached to the holding fixture (point of suspension or support) and the point at which the holding fixture is fixed to the body of the structure. Further, there is a second signal transmitter that registers the change in length induced by the actuator (i.e., the position of the part of the holding fixture that has been moved) and transmits it to the control device so that the temperature-dependent nominal length of the holding fixture can adjust itself at all times.

The actuator may, for example, take the form of a rack-and-pinion drive or worm gear driven by an electric motor; or it can be a piston assembly. The piston assembly can be hydraulically or pneumatically driven. This last is to be recommended, especially for use in power stations, since compressed air lines are almost always available in power stations. Moreover, if the piston assembly is pneumatically driven, there is no need for a return line for spent compressed air. Still further, the impact forces transmitted to the structure of the building are damped by the elasticity of the pressure cushion, and significant sources of danger connected with other working fluids (e.g., the inflammability of hydraulic fluid) are absent.

Electronic control units can with advantage be used as regulating devices. It is particularly advantageous if, in conjunction with the use of a piston assembly, the regulating device takes the form of a system with servo-actuated inlet and outlet valves (or, in the case of pneumatic piston assembly, air inlet and outlet valves).

In the matter of signal transmitters, consideration should in the first place be given to electrically operating appliances such as wire strain gauges and capacitive or inductive displacement pickups. It would be of advantage to use wire strain gauges for registering any thermically-induced change in length of the pipe-line (first signal transmitter) and capacitive or inductive displacement pickups for registering any change in length of the holding fixture (second signal transmitter). For use in power stations, however, where pipe-lines run hot, and particularly in connection with the use of a piston assembly as the actuator, it would be desirable to employ the design of a mechanical signal transmitter described below.

The apex of a bell-crank, the first arm of which runs parallel to the axis of the pipe and the second arm of which should preferably be angled vertically to the first arm, rests on a metal mounting support fixed to the pipe in such a way that it can pivot. Hinged to the end of the second arm is a control rod lying roughly parallel to the axis of the pipe and with its other end hinged to a metal mounting support which is rigidly connected to the pipe-line. Both metal support mountings should preferably be fastened by pipe clamps. Both the control rod and the bell-crank are in practice outside the influence of the temperature of the pipe-line—i.e., outside the insulation. If the temperature in the wall of the pipe changes, the control rod shows no thermically-induced change in length, so that in that case the bell-crank makes a rotary movement. With the aid of a Bowden cable, which has its sheath attached to the control rod mounting support and its core attached to the free end of the first arm of the bell-crank, the rotary movement is transmitted as a displacement adjustment to the regulator, where it can actuate an electric switch, for example, or a control valve to switch on the actuator of the holding fixture. To this extent this design represents the first signal transmitter. A holder is firmly attached to the retractable portion of the actuator and the other end of the Bowden cable sheath is fixed to the holder.

By this means the end of the Bowden cable connected to the regulator is moved with the retractable portion of the actuator (i.e., without the sheath and the core's moving relative to each other), so that the actuator is switched off when the holding fixture reaches its theoretical position (second signal transmitter).

The use of this kind of signal transmitter system for controlling the movements of the pipe-line is particularly advantageous in conjunction with a hydraulic or pneumatic control device in which control valves for the servo-activated operation of the inlet and outlet valves of a piston assembly are actuated via a tipping lever. To do this, the core of the Bowden cable is connected to one end of the fixed position tipping lever opposite to the immovable portion of the actuator. It is of advantage if indirect admission valves are used as the control valves.

It is desirable to insert in the core of the Bowden cable (outsde the sheath) a spring-loaded length-compensating element between the tilting lever and the bell-crank. If the spring tension is exceeded, this element increases in length, thus increasing the length of the Bowden cable and obviating the danger of damage to the components if the core of the Bowden cable makes a sudden and violent movement.

In another design of the holding fixture as envisaged by the invention, the fixed and the retractable portions of the piston assembly are permanently connected to one of two telescopically nested housing components, and the housing components are braced against each other by a spring in such a way that at least part of the weight of the pipe-line can be transmitted to the structure of the building via the two components of the housing and the spring. It is desirable that, the spring tension selected be such that whether the pipe be cold or hot, it will correspond to the whole of the load to be distributed at the point of suspension or support. This will ensure that, even if the supply of pressure required for the piston assembly fails, the holding fixture's load-distributing function will be maintained to a large extent. The holding fixture, which in its basic form is merely a control element, can be extended to form a controlling and simultaneously load-bearing holding fixture in the manner described.

In the case of a pneumatic piston assembly, its reliability can be increased by inserting a compressed air accumulator in the compressed air line to the control valves, this accumulator being secured in relation to the compressed air network by a non-return valve. This would ensure that the control function continued even if there were a failure in the compressed air supply.

It has been shown to be of advantage to include a shock-absorber to prevent jerky control movements of a holding fixture fitted with a piston assembly. One side of the shock-absorber is attached to the movable portion of the piston assembly and the other to the fixed portion. A further beneficial damping possibility consists in fitting one-way throttle valves to the piston assembly feed lines.

In order not to cause a complete blockage of further pipe movement in a holding fixture fitted with a piston assembly if the pressure medium fails completely, a short-circuit line can be inserted between the pressure medium feed lines. In normal operation, the short-circuit line is kept closed by a pressure-loaded stop valve. If the pressure in the supply network falls below a certain minimum operating pressure, the stop valve opens automatically. Pressure equalization can then be brought about between the upstream and downstream sides of the piston in the pressure cylinder of the piston assembly. It is desirable that the short-circuit line be so laid out that pressure equalization can only occur via a one-way throttle valve in order to prevent jolting movements in the pipe-line.

The holding fixture in accordance with the invention enables the creation of a further very advantageous design, making it possible to control pipe-line movements ascribable not to the thermic behaviour of the pipe itself but to the thermic behavior of components such as a boiler or turbine to which the pipe-line is connected. There is no difficulty about fitting one or more signal transmitters by means of which thermically-induced changes of length in these components (the behaviour of which may differ very markedly from the behaviour of the pipe-line) are registered and connecting the signal transmitter(s) to the regulator. In this regard, the mechanically operating signal transmission system already described may with advantage be extended as follows.

A two-armed lever whose pivot is arranged to be fixed in relation to the structure of the building is positioned in the immediate vicinity of the component whose thermically-induced expansion is to be registered in such a way that, for example, any rotation is transmitted to one arm of the lever by one of the cams attached to the component.

The core of a second Bowden cable is attached to the other end of the lever, the sheath at this end of the Bowden cable being firmly attached to parts of the structure of the building. The second Bowden cable transmits the deflection caused by the action of the two-armed lever to the first Bowden cable as a kind of superimposed measured value signal, giving rise to a corresponding change in the effective length of the sheath of the first Bowden cable.

The effective length of the sheath can be varied because it ends on the bell-crank (first signal transmitter) side in two tubes, one sliding telescopically inside the other, one tube being made fast to the metal mounting support of the control rod and the other to the sheath itself. The other end of the core of the second Bowden cable is also attached to the mounting support of the control rod, while the end of the sheath belonging to it is rigidly connected to the sheath of the first Bowden cable via a connecting piece.

The two sliding tubes of the first Bowden cable are held apart by a spring so that any pulling or pushing movement of the core of the second Bowden cable will always induce a corresponding increase or decrease in the effective length of the first Bowden cable.

It is axiomatic that the selection of the type of lever (bell-crank lever, two-armed lever) in the signal transmitters enables deflections transmitted to the Bowden cables (and thus the size of the controlled pipe-line displacement) to be determined.

Further explanation of the invention is provided by the following forms of construction.

DETAILED DESCRIPTION OF THE PRESENTLY PREFERRED EMBODIMENTS

Figure 1:
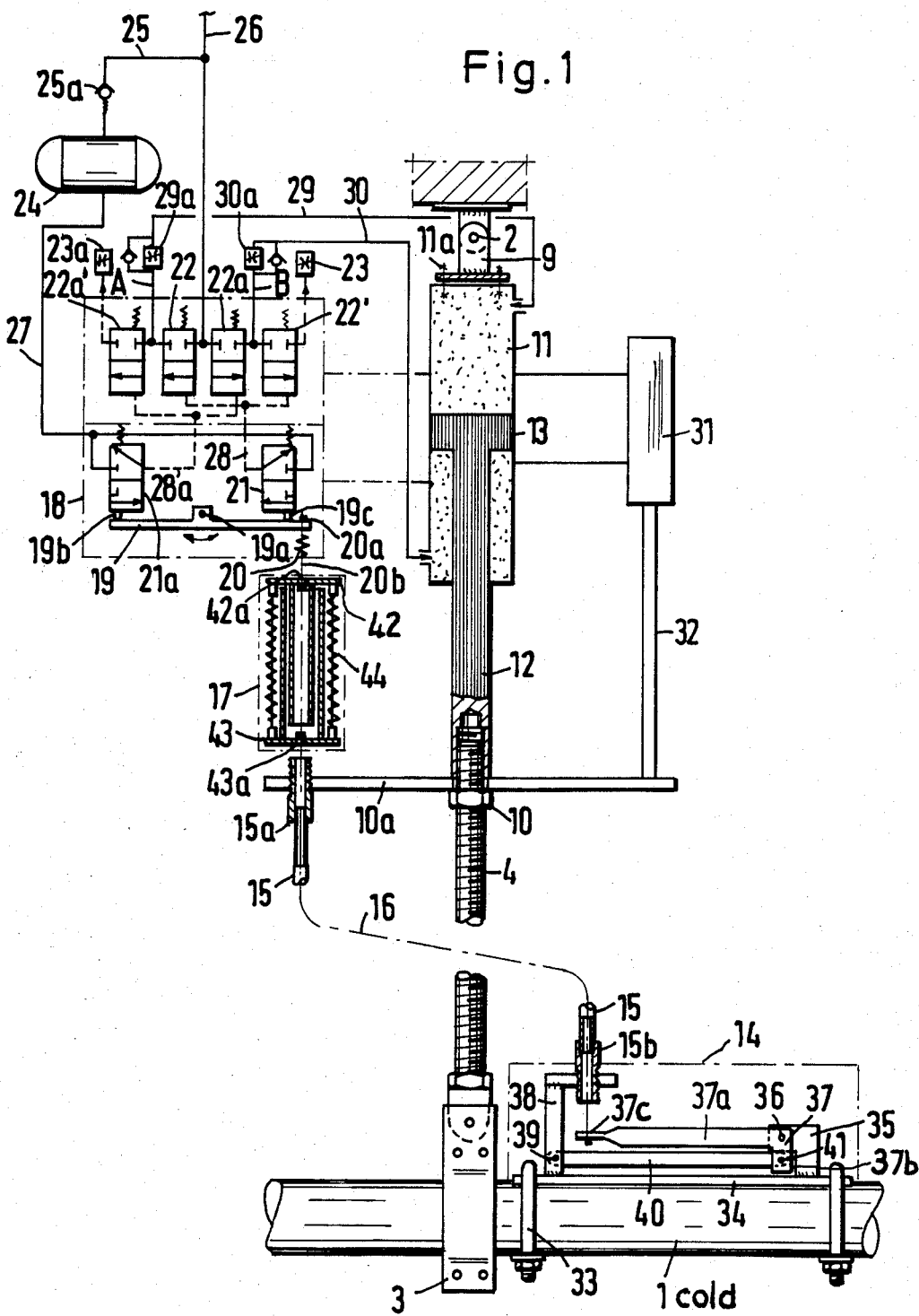
FIG. 1 shows a controlling holding fixture designed as a suspensory device with pneumatic actuator.

In FIG. 1 a holding fixture in accordance with the invention is depicted as a control suspension mounting with part of it cut away. The pipe-line to be held is a high-temperature steam line, of which only a horizontal pipe section 1 is depicted. Heating the pipe in the vertical pipe sections results in downward movement of the horizontal pipe section 1 due to expansion. The pipe section 1 is connected with a threaded rod 4 of the control suspension mounting via a pipe clamp 3. The threaded rod 4, which is divided into two and the length of which can be varied by a screw shackle 4a (see FIG. 2), screws into a piston rod 12 of an actuator designed as a pneumatic piston assembly for altering the length of the control suspension mounting. The piston rod 12 is permanently connected to a piston 13 nesting in a compressed air cylinder 11. An attachment collar 9 is screwed by screws 11a on to the top of the compressed air cylinder 11, and the attachment collar 9 is hinged to a part of the structure of the building at an anchorage 2.

In the form depicted, the control suspension mounting has only a control function and no load-bearing function. By retracting or extending the piston rod 12, the piston rod 12 can move the pipe section at right angles to the axis of the pipe in a way that will correspond to the thermically-induced expansion of the pipe. The method of doing this is that a signal transmitter 14 registers the thermically-induced change in the length of the pipe and passes it on to a regulator 18 for regulating the assembly of the components 11, 12 and 13.

The signal transmitter 14 is designed as a mechanical compound lever arrangement. Two metal mountings 35 and 38 are welded on to a metal plate 34 opposite to each other and at a distance. The metal plate 34 is attached to the pipe section 1 by means of pipe clamps 33 in the direction of the axis of the pipe line so that it experiences changes in the temperature of the wall of the pipe and changes its length in step with the relevant section of pipe. An angle lever 37 having a long arm 37a and a short arm 37b at right angles to each other is mounted on the metal mounting 35 and able to pivot about a fulcrum 36. While the long arm 37a runs approximately parallel to the axis of the pipe, the short arm 37b is at right angles to it. The free end of the short arm 37b is hinged at 41 to one end of a control rod 40 which runs parallel to the axis of the pipe and whose other end is hinged to the metal mounting 38 at an attachment point 39, free to pivot.

Screwed into the metal mounting 38 there is an adjustment tube 15b in which a sheath 15 of a Bowden cable 16 ends. The core of the the Bowden cable 16 is connected at 37c to the free end of the long arm 37a of the angle lever 37. The control rod 40 and the angle lever 37 are positioned outside the the insulation (not depicted) of the pipe section 1, so that they are always at ambient temperature.

Figure 3:
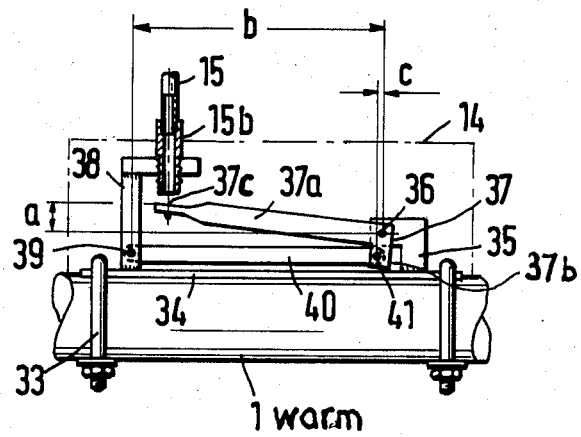
FIG. 3 shows a signal transmitter for the registering of thermically-induced changes in the pipe-line in hinged position.

If the pipe section 1 (a live steam line, for example) is put into operation starting from cold (FIG. 1), there occurs a thermically-induced change in length which, as FIG. 3 shows, is evinced by the fact that the distance between the fulcrum 36 and the attachment point 39 increases by an amount c to a length b because the two metal mountings 35, 38 experience the same thermically-induced change in length as the pipe section 1. The distance between the attachment point 39 and the hinge 41 remains unaltered, however, because the rod 40 is still at ambient temperature. Consequently, the angle lever 37 is forced into a rotary movement about the fulcrum 36, which makes itself evident in an upward longitudinal movement of the core of the Bowden cable 16. Conversely, when the pipe section 1 cools down, the core of the Bowden cable 16 is pulled downwards.

In FIG. 3, the core of the Bowden cable 16 has been pushed upwards in relation to its starting position by a distance a. By appropriate selection of the leverage of the angle lever 37, it can be ensured that a given thermically induced expansion will produce a certain movement of the core of the Bowden cable 16. In order to allow for some degree of adjustment, it is desirable that the position of the connection 37c be designed to be variable.

The Bowden cable 16 leads to the regulator 18. The end of the sheath 15 ends in a second adjustment tube 15a, which is screwed into a mounting 10a supported by means of a nut 10 on the threaded rod 4.

The end of the core of the Bowden cable 16 is extended by a length-equalizing element 17 and a piece of wire 20b. The piece of wire 20b is directly connected to a first end (20a) of a two-armed tilting lever 19 in the regulator 18. The purpose of the length-equalizing element 17 is to limit the tensile force transmittable by the Bowden cable 16 in order to ensure that, in the event of a failure, there will be no damage to the elements connected to the Bowden cable 16.

The length-equalizing element 17 consists of two pieces of tubing telescoped one inside the other. One piece of tubing has a cover plate 42 welded on to it and the other piece of tubing has a cover plate 43 welded on to it. The cover plates 42, 43 are held together by a tension spring 44. The core of the Bowden cable 16 and the piece of wire 20b are attached to the cover plates 43 and 42 at points 43a and 42a, respectively. As soon as the pull on the core of the Bowden cable 16 exceeds the tension in the tension spring 44, the length-equalizing element 17 is pulled apart, causing the Bowden cable 16 to lengthen. If the pull on the core of the Bowden cable 16 is slight, the length of the length-equalizing element 17 remains constant.

The tilting lever 19 in the regulator 18 can pivot on a fulcrum 19a. The two arms touch one or other of actuating buttons 19b or 19c of indirectly admitting pneumatic control valve 21a or 21. On the side of the tilting lever 19 to which the piece of wire 20b is attached, there is a pressure spring 20 which is braced against the housing of the regulator 18 connected with the wall of the compressed air cylinder 11 and thus ensures that the tilting lever 19 can react in both directions to any displacement of the core of the Bowden cable 16.

The control valves 21, 21a are linked to a compressed air network 26 by the branch circuit 25, 27. In order to ensure that the control valves 21, 21a will continue to function even if the compressed air supply is interrupted and thus prevent a blockage of the control suspension mounting, a compressed air accumulator 24 is inserted between the branch circuit 25 and the branch circuit 27. The accumulator 24 is secured relative to the compressed air network 26 by a non-return valve 25a.

When switched on, the control valve 21 actuates an air valve 22 via a signal line 28 (depicted by a dotted line). The air valve 22 sends compressed air to the top end of the piston 13 in the compressed air cylinder 11 through a line 29 and actuates a vent valve 22'. The vent valve 22' which releases the compressed air below the piston 13 through a line 30, enabling the piston 13 to move downwards. Conversely, when it is switched on control, the valve 21a can actuate via a signal circuit 28a on air valve 22a. The air valve 22a sends compressed air through the line 30 to the bottom end of the piston 13 in the compressed air cylinder 11, and a vent valve 22'a releases the compressed air at the top end of the piston 13 from the compressed air cylinder 11 by way of the line 29, enabling the piston 13 to move upwards again.

The movement of the piston 13 ceases as soon as the two control valves 21, 21a are at rest. If, for example, the signal transmitter 14 moves from its initial position to the position shown in FIG. 3, the first end 20a of the tilting lever 19 is moved upwards, so that the control valve 21 is actuated by the activating button 19c. As a result of the activation of the valves air valve 22 and the vent valve 22', compressed air is sent to the top end of the piston 13 in the compressed air cylinder 11 while the air at the bottom end is vented, allowing the piston 13 to move downwards. At the same time, however, the end of the Bowden cable 16, the length-equalizing element 17, and the piece of wire 20b are moved downwards in sympathy, so that the control valve 21 is automatically shut off again as soon as the piston 13 has moved downwards by the same distance as the core of the Bowden cable 16 originally moved upwards. The same applies in the event that the core of the Bowden cable 16 is moved downwards. Consequently, the lifting movement of the core of the Bowden cable 16 will always be followed by an equal but opposite lifting movement of the piston 13.

In order to prevent jerky movements of the piston 13, the air and vent valves 22, 22a and 22' and 22'a are coupled at the outlet side to one-way throttle valves 29a, 30a and throttle valves 23, 23a, respectively. In addition, a shock-absorber 31 having a piston rod 32 is connected to the compressed air cylinder 11. The piston rod 32 of the shock absorber 31 is attached to the piston rod 12 via mounting the 10a.

This design as a purely controlling control suspension mounting requires a buckleproof threaded rod 4. Altogether this produces a considerably lighter, more compact—and thus cheaper—type of construction than with conventional control suspension mountings, the cost of installation being about the same. What is particularly important is that this holding fixture, which can of course also be installed the other way round as a support fixture, can also be fitted to pipelines that have only very short straight stretches, because the signal transmitter 14 can be made very much shorter than the requisite lengths of the control rods of conventional control suspension mountings, and it is not even necessary to install it immediately next to the actual point of suspension or support. Moreover, it induces practically no additional stresses in the pipe section 1.

Figure 2:
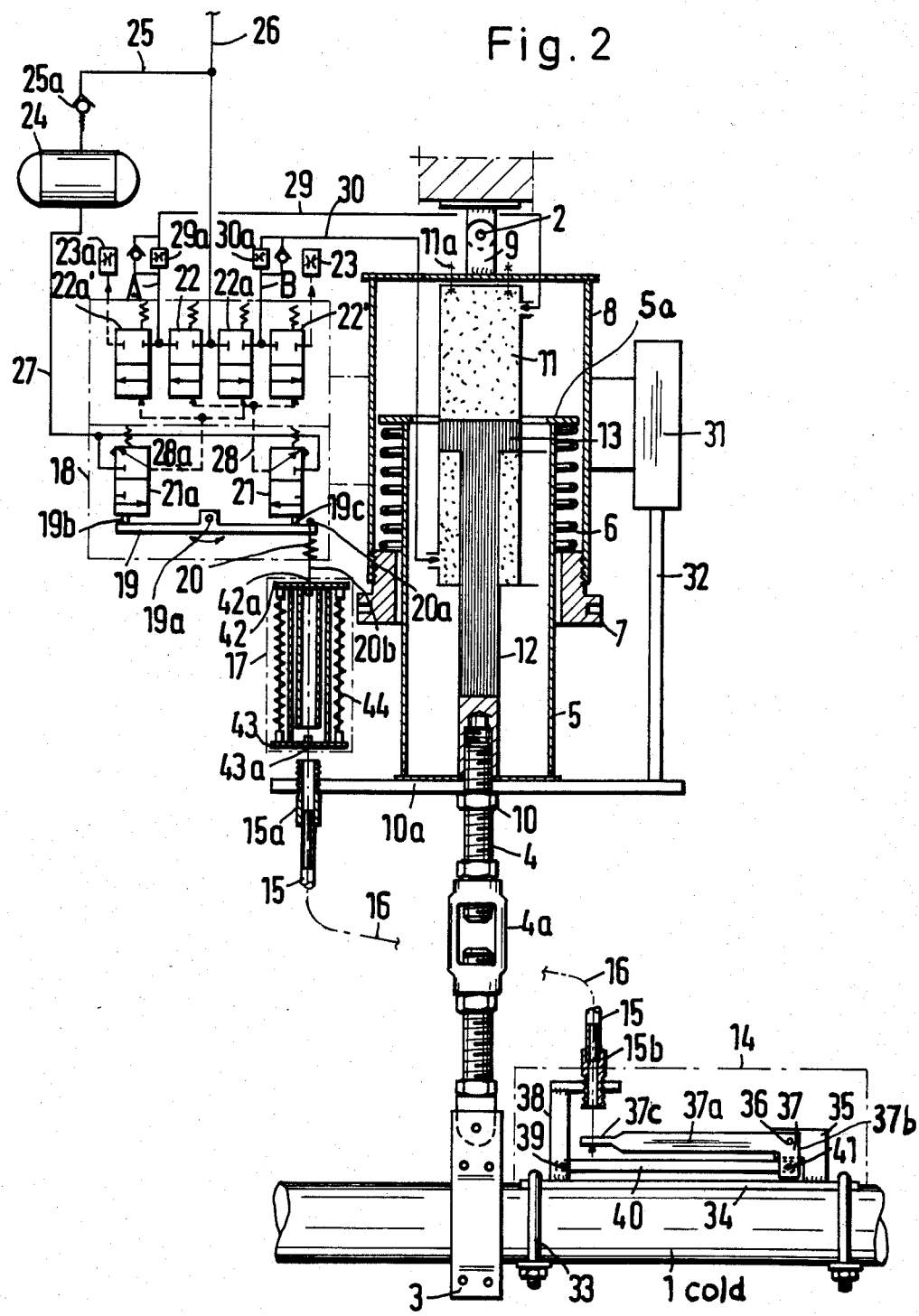
FIG. 2 shows a holding fixture in accordance with FIG. 1 with an additional load distributing function.

The control suspension mounting shown in FIG. 2 differs from the one shown in FIG. 1 only in that, in addition to a purely controlling function, it also has a load-distributing function. This is implemented by two tubular housing components 5, 8, the one telescopically inserted into the other, which enclose the compressed air cylinder 11 and each of which has a cover plate welded to its external end. The end of the compressed air cylinder 11 and the end of the piston rod 12 are attached in each case to one of the cover plates. The top of the housing component 5 that lies inside the external housing component 8 has an exterior collar 52. The exterior collar 52 forms a support for a compression spring 6 positioned around tubular housing component 5.

The other support for the compression spring 6 is designed as an adjusting screw 7 surrounding the tubular housing component 5 and screwed on to the end facing away from the cover plate in the tubular housing component 8. When the control suspension mounting is in the holding posture (direction of pull), the two housing components 5, 8 are braced against each other through the compression spring 6. The pipe-line loading to be transmitted to the structure of the building via the compression spring 6 at any desired position of the control suspension mounting can be set to the desired value—for example, to the loading with the pipe-line 1 hot or cold—depending on how far the adjusting screw 7 is screwed in.

The control function of the control suspension mounting in FIG. 2 is implemented in the same way as in FIG. 1. Neither figure shows a short-circuit line connecting the two lines 29, 30 below the one-way throttle valves 29a, 30a at points A and B. During normal operation, the short circuit line is closed by a stop valve that automatically opens if there is a drop in the pressure in the compressed air network 26 to, e.g., 3 bars, thus preventing a blockage of the control suspension mounting (pressure equalization inside the compressed air cylinder 11).

This item can be employed in addition to or instead of the installation of the compressed air accumulator 24. In the case of the control suspension mounting shown in FIG. 2, the load-distributing function is largely maintained even if the supply of compressed air is interrupted. This device, however, unlike the purely controlling control suspension mounting shown in FIG. 1 does not require a buckleproof threaded rod 4.

FIGS. 4 to 7 explain an example of an advantageous further development of a holding fixture in accordance with the invention as shown in FIG. 1 or FIG. 2. This assumes that displacement of the pipe section 1 depends not only on the thermal expansion behaviour of the pipe-line itself, but also on the thermal expansion behaviour of the component (e.g., a boiler) connected to it.

Such junction points for pipe-lines cannot be designed as absolutely fixed anchorages, but must be relative anchorages. Previous control suspension mountings could only be used for this up to a point, since they react only to the thermal behaviour of the pipe-line itself.

Figure 4:
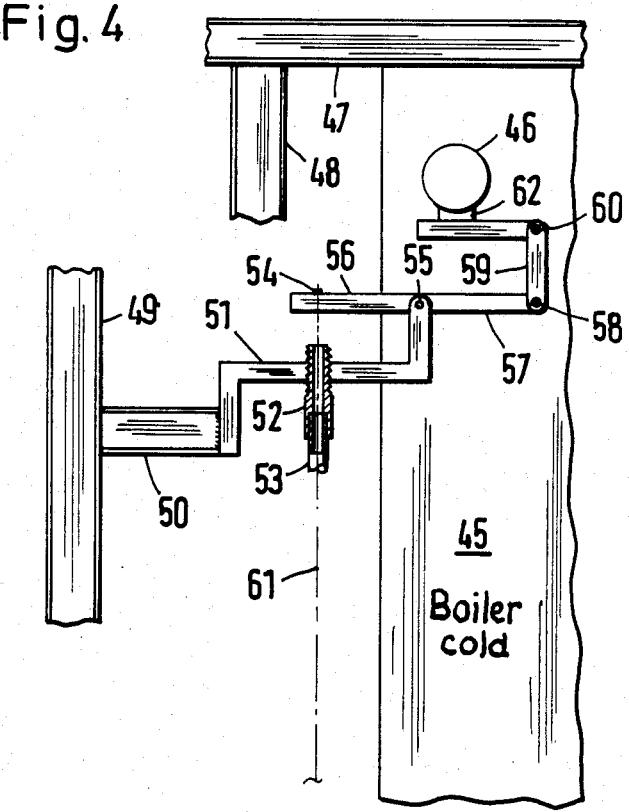
FIG. 4 shows a signal transmitter for the registering of thermically-induced changes in length of a boiler.
Figure 5:
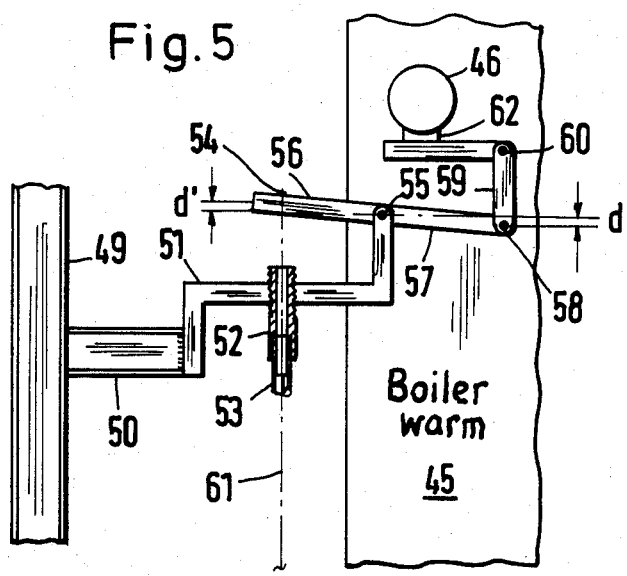
FIG. 5 shows the signal transmitter in accordance with FIG. 4 in its deflected position.

FIGS. 4 and 5 show sections of a boiler 45, suspended on supporting frame 47, 48, with a high-temperature steam exhaust header 46. When the boiler 45 is started up, thermal expansion causes the steam exhaust header 46 to move downwards. This movement is transmitted to an arm 57 of a two-armed lever 56, 57 via a pipe support 62 attached to the steam exhaust header 46. The pipe support 62 is furnished with a transmission sheet, by means of a pivoted connecting rod 59 attached to the transmission sheet at a point of attachment 60 (58). The two-armed lever 56, 57 has a fixed fulcrum 55. The fixed fulcrum 55 is supported by mounting 51 welded to beam 50, which is in turn fixed to a structural pillar 49. The sheath of a Bowden cable 61 is also attached to the mounting 51 by a sliding tube 52. The core of the Bowden cable 61 is connected at an attachment point 54 to the arm 56 of the two-armed lever 56, 57. A downward movement by the steam exhaust header 46 of length d therefore causes an upward movement (pull) of the core of the Bowden-cable 61 by a length d' (FIG. 5) corresponding to the leverage.

Figure 6:
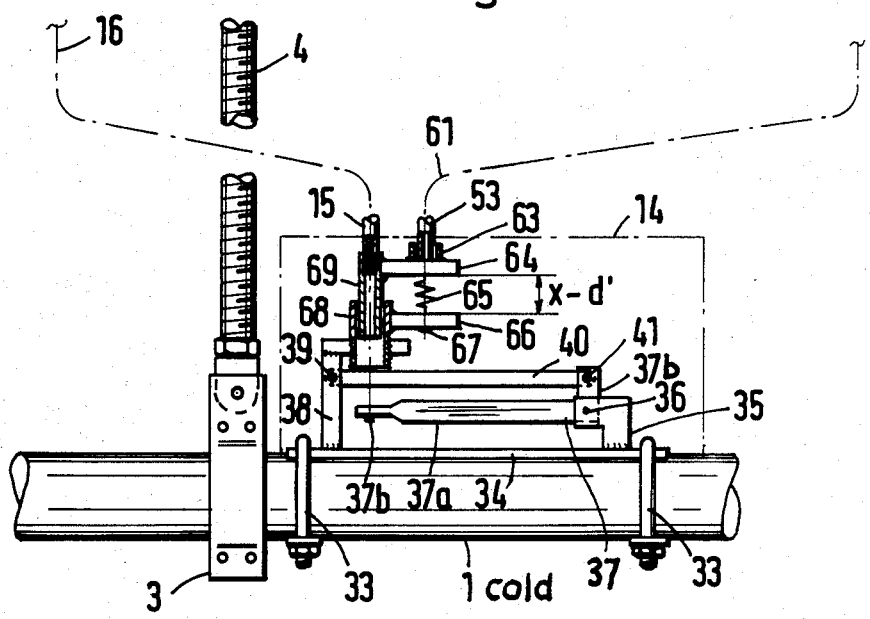
FIG. 6 shows a signal transmitter in accordance with FIG. 3 with the additional superimposition of the measured value shown by the signal transmitter in FIG. 4.
Figure 7:
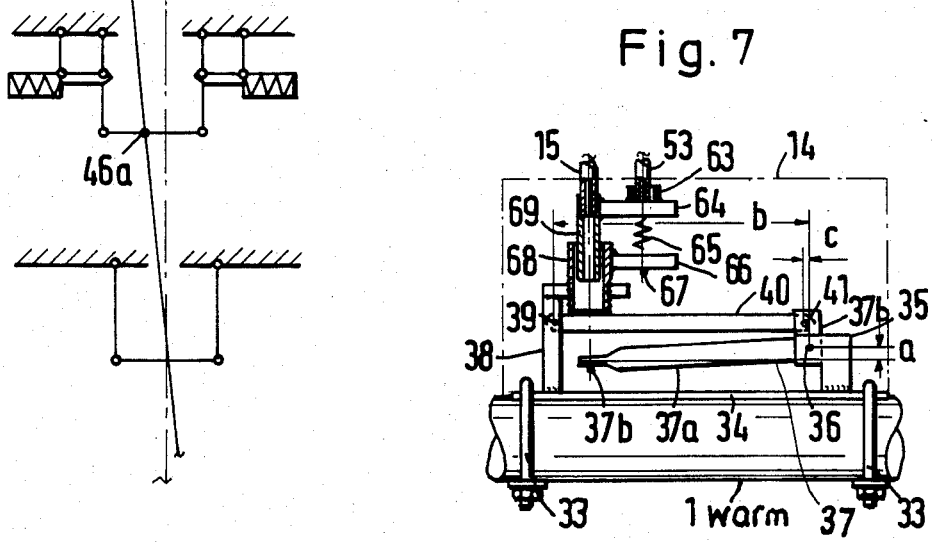
FIG. 7 shows the signal transmitter in accordance with FIG. 6 in its deflected position.

FIGS. 6 and 7 show how the movement of the steam exhaust header 46 registered through the compound lever arrangement is passed on to the signal transmitter 14, which registers the thermal expansion of the pipe section 1. Since the functioning of the signal transmitter 14 is largely similar to the functioning of the signal transmitter 14 in FIGS. 1–3, the same reference figures have been used. The only difference is that the short arm 37b of the angle lever 37 has been turned through 180° so that in its resting position it is pointing vertically away from the axis of the pipe.

As FIG. 7 shows, thermal expansion results in a downward movement of the long arm 37a and thus in a shortening of the length of the control suspension mounting, of which FIG. 6 does not show the part attached to the structure of the building but which corresponds in all respects to what appears in FIG. 1 and FIG. 2.

Otherwise the signal transmitter 14 in FIG. 6 is different in that the sheath of the Bowden cable 15, 16 ends in a sliding piece 69 that is free to move in an adjusting tube 68 screwed into the metal mounting 38. A mounting 64, to which an adjusting tube 63 is attached, is welded to the sliding piece 69. The other end of a sheath 53 of the Bowden cable 61 is screwed into the other end of the adjusting tube 63. The core of the Bowden cable 61 is led through a hole in the mounting 64 and is attached to a mounting 66 at attachment point 67. The mounting 66 is welded to the adjusting tube 68.

A compression spring 65 is located between the mountings 64, 66 to ensure that the adjusting tube 68 and the sliding piece 69 do not approach each other as long as the Bowden cable 61 is not being operated. To that extent, the whole system behaves like the system depicted in FIGS. 1 and 2 that is to say, it reacts to thermal expansion in the pipe section 1. If, however, the steam exhaust header 46 moves downwards as shown in FIG. 5, the core of the Bowden cable 61 is pulled upwards by a length d', thus shortening by an amount d' the distance x between the mountings 64, 66. This causes a with corresponding depression of the compression spring 65, the spring tension of which must be greater that that of the pressure spring 20. This means a corresponding shortening of the effective length of the sheath 15 of the Bowden cable 16, that is to say, a relative upward movement of the core of the Bowden cable 16 in to the sheath 15. This triggers off in the regulator 18 the reactions already described, leading in this example to the result that the section 1 is moved downward by the corrective distance d'.

Figure 8:
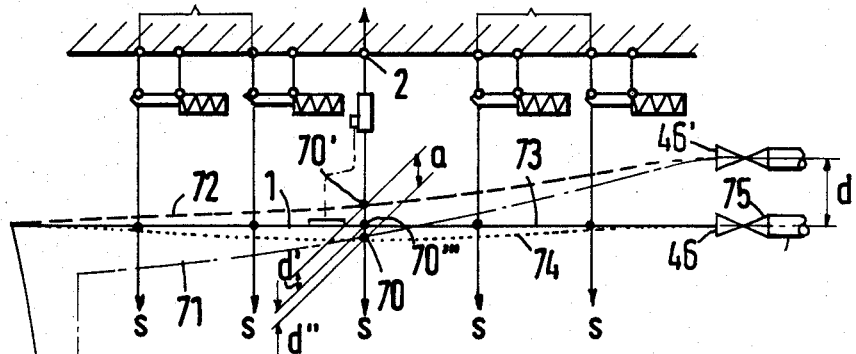
FIG. 8 is a diagrammatic representation of the possible use of a holding fixture in accordance with the invention.

The operation of a control suspension mounting in accordance with the invention as shown in FIGS. 1-3 and FIGS. 4-7 is explained once more by the diagrammatic representation at FIG. 8. The horizontal positions of the pipe section 1 shown in the upper portion are assigned to the varying types of loading by different kinds of broken lines—i.e., a dash-dotted line 71 relates to loading condition "Operating condition cold" (both boiler and pipe cold), a broken line 72 relates to loading condition "temporary boiler repair" (boiler cold and pipe-line hot; a slide-valve damper 75 closed), and an unbroken line 73 and a dotted line 74 relate to loading condition "operating condition hot" (both boiler and pipe-line hot). The dotted line refers to an unplanned pipe-line displacement due to using constant suspension mountings exclusively as holding devices—i.e., without thermal movement control. The displacement of a point of support 70 of the dash-dotted line 71 to a point 70' of the broken line 72 by dimension a shown in FIG. 8 can be directly regulated by the type of control suspension mounting shown in FIGS. 1 and 2 by means of the thermally controlled actuator.

By contrast, the displacement of the point of support 70' on the broken line 72 to a point 70" on the unbroken line 73 by dimension d', which is dependent on the vertical displacement d of the steam exhaust header 43 and is thus an additional variable, can only be additionally regulated by the use of the modified type of suspension mounting depicted in FIGS. 4-7.

I claim:

1. A holding fixture for a pipe-line, said holding fixture comprising:
   (a) a thermally conductive base (34) which, in use, is in thermal contact with a pipe-line (1) extending in a first direction;
   (b) a first mounting (35) projecting from a first point on said thermally conductive base (34);
   (c) a second mounting (38) projecting from a second point on said thermally conductive base (34);
   (d) a control rod (40) having a first end pivotally mounted (39) on said second mounting (38) and a second end, said control rod (40) extending at least substantially in said first direction and being at least substantially thermally isolated from the pipe-line (1) during use of said holding fixture;
   (e) an angle lever (37) having a fulcrum (36) pivotally mounted on said first mounting (35), a first arm (37b) that is pivotally connected to said second end of said control rod (40), and a second arm (37a), whereby said angle lever (37) pivots about its fulcrum (36) in response to torque exerted on said first arm (37b) due to thermally induced changes in the distance between said first and second points on said thermally conductive base (34);
   (f) a first Bowden cable 16 having a first end attached to said second arm (37a) of said angle lever (37) and a second end;
   (g) a tilting lever (19) having a fulcrum (19a) that is fixed relative to said thermally conductive base (34) and at least one arm that is pivotable relative to said fulcrum (19a) and that is connected to said second end of said first Bowden cable (16);
   (h) first means (11,12,13) for moving the pipe-line (1) back and forth in a direction perpendicular to said first direction;
   (i) second means (21) for causing said first means (11,12,13) to move the pipe-line (1) in a first way in response to an angular movement of said tilting lever (19) in a first sense; and
   (j) third means (21a) for causing said first means (11,12,13) to move the pipe-line (1) in a second way in response to an angular movement of said tilting lever (19) in a second sense.

2. A holding fixture for a pipe-line as recited in claim 1 and further comprising fourth means (15a,15b) for adjusting the length of said first Bowden cable (16).

3. A holding fixture for a pipe-line as recited in claim 1 wherein the distance between said fulcrum (36) of said angle lever (37) and the pivotal connection between said first arm (37b) and said control rod (40) is less than the distance between said fulcrum (36) of said angle lever (37) and the point where said second arm (37a) is attached to said first Bowden cable (16).

4. A holding fixture for a pipe-line as recited in claim 1 and further comprising a length-equalizing means (17) for limiting the tensile forces transmitted by said first Bowden cable (16) in order to ensure that, in the event of a failure, there will be no damage to the elements connected to said first Bowden cable (16).

5. A holding fixture for a pipe-line as recited in claim 4 wherein said length-equalizing means (17) comprises:
   (a) a first cover plate (43) connected to said second end of said first Bowden cable (16);
   (b) a second cover plate (42) spaced from said first cover plate (43); and
   (c) a tension spring (44) having a first end connected to said first cover plate (43) and a second end connected to said second cover plate (44).

6. A holding fixture for a pipe-line as recited in claim 1 wherein:
   (a) said tilting lever (19) has a first arm that is connected to said first Bowden cable (16) and a second arm;
   (b) said second means (21) is operatively connected to said first arm; and
   (c) said third means (21a) is operatively connected to said second arm.

7. A holding fixture for a pipe-line as recited in claim 1 wherein said first means (11,12,13) comprises a pneumatic piston-and-cylinder combination.

8. A holding fixture for a pipe-line as recited in claim 7 wherein said piston-and-cylinder combination comprises a rod (4,12) that, in use, is connected to the pipe-line (1).

9. A holding fixture for a pipe-line as recited in claim 8 and further comprising fifth means for (4a) for adjusting the length of said rod (4,12).

10. A holding fixture for a pipe-line as recited in claim 1 wherein said second and third means (21,21a) are a first and second pneumatic control valve, respectively.

11. A holding fixture fr a pipe-line as recited in claim 10 and further comprising a compressed air accumulator (24) operatively connected to said second and third means (21,21a).

* * * * *